United States Patent
Rudys et al.

[11] Patent Number: 5,845,958
[45] Date of Patent: Dec. 8, 1998

[54] VEHICLE TRANSPORT COVER

[75] Inventors: Stasys K. Rudys; David C. Jones, both of Midlothian, Va.; Virginia McAndrews Walsh, Philadelphia, Pa.; Linda C. Fisher, Wilmington, Del.; Ross W. Knapp, Wyandotte, Mich.; Charles B. Simon, Blue Bell, Pa.

[73] Assignee: E. I. du Pont de Nemours and Company, Wilmington, Del.

[21] Appl. No.: 813,738

[22] Filed: Mar. 7, 1997

Related U.S. Application Data

[63] Continuation-in-part of Ser. No. 561,764, Nov. 22, 1995.
[51] Int. Cl.$^6$ ........................................................ B60J 11/00
[52] U.S. Cl. ............................................. 296/136; 150/166
[58] Field of Search .................................. 296/95.1, 136; 150/166

[56] References Cited

U.S. PATENT DOCUMENTS

| | | | |
|---|---|---|---|
| 2,065,242 | 12/1936 | Omerly, Jr. | 160/370.21 |
| 3,169,899 | 2/1965 | Steuber | 428/198 |
| 3,653,497 | 4/1972 | Hornstein | 206/335 |
| 3,763,908 | 10/1973 | Norman | 150/166 |
| 4,589,459 | 5/1986 | Lantrip | 150/166 |
| 4,635,996 | 1/1987 | Hirose | 296/136 |
| 4,684,568 | 8/1987 | Lou | 442/76 |
| 5,029,933 | 7/1991 | Gillem | 296/136 |
| 5,042,836 | 8/1991 | Swanson | 280/770 |
| 5,275,460 | 1/1994 | Kraus | 296/136 |

FOREIGN PATENT DOCUMENTS

| 2543891 | 10/1984 | France | 296/136 |
|---|---|---|---|

OTHER PUBLICATIONS

Shift, 3M Automotive, p. 9, "Just What the Doctor Ordered", Issue 1, 1995 (published Feb. 1995).

*Primary Examiner*—Andrew C. Pike

[57] ABSTRACT

A motor vehicle transport cover is made of a vapor permeable, water impermeable, synthetic nonwoven sheet. The transport cover includes a mechanism for firmly attaching the nonwoven sheet in a position on a motor vehicle that covers substantially all of the roof, hood, and front bumper fascia of the vehicle and remains attached at air speeds along the major axis of the vehicle of at least 50 mph. The attachment mechanism is readily releasable and it leaves no visible adhesive residue on the vehicle at the moment the nonwoven sheet is removed from the vehicle. The transport cover may be a unitary cover that covers substanstially all of the finished surfaces of a covered vehicle. The transport cover does not prevent driver access to a covered vehicle and it does not unduly obstruct the view of a driver of a covered vehicle.

15 Claims, 6 Drawing Sheets

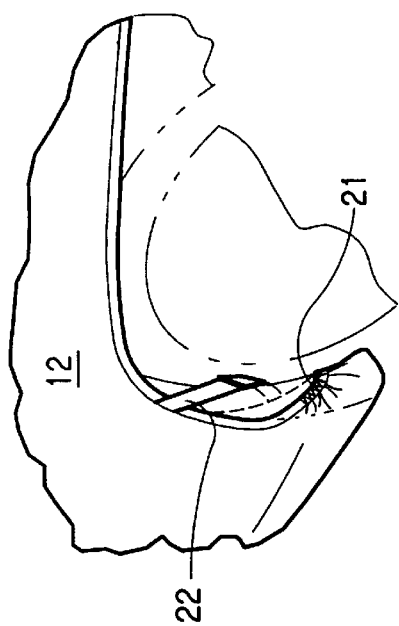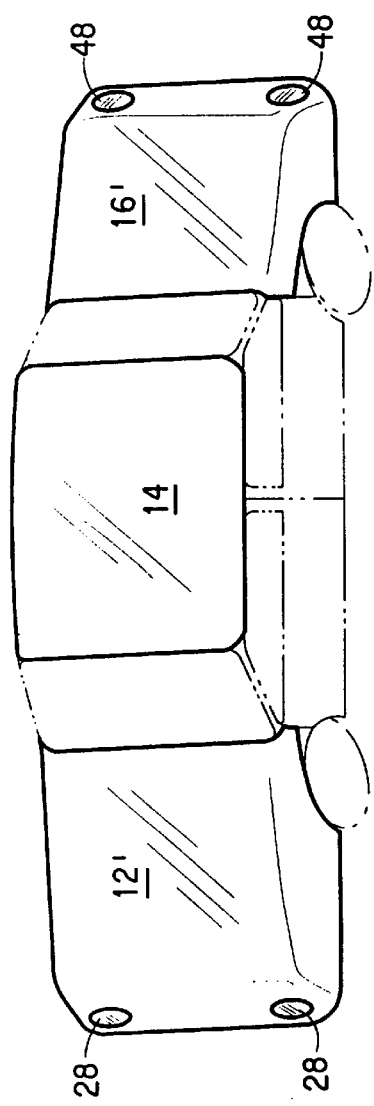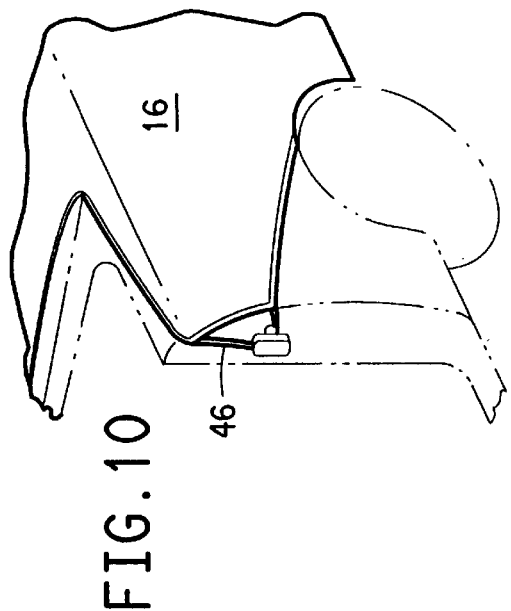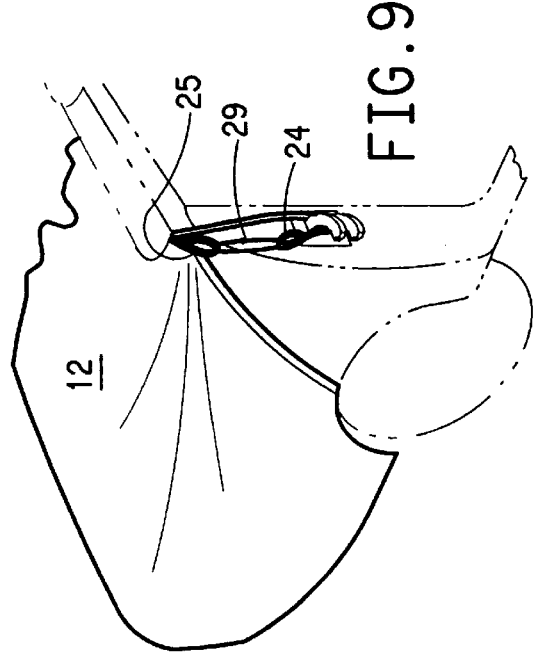

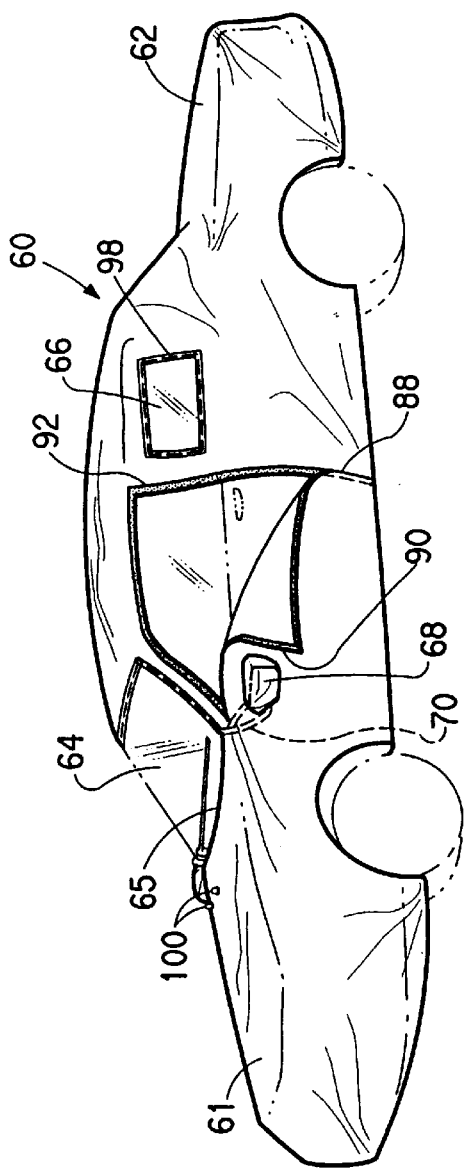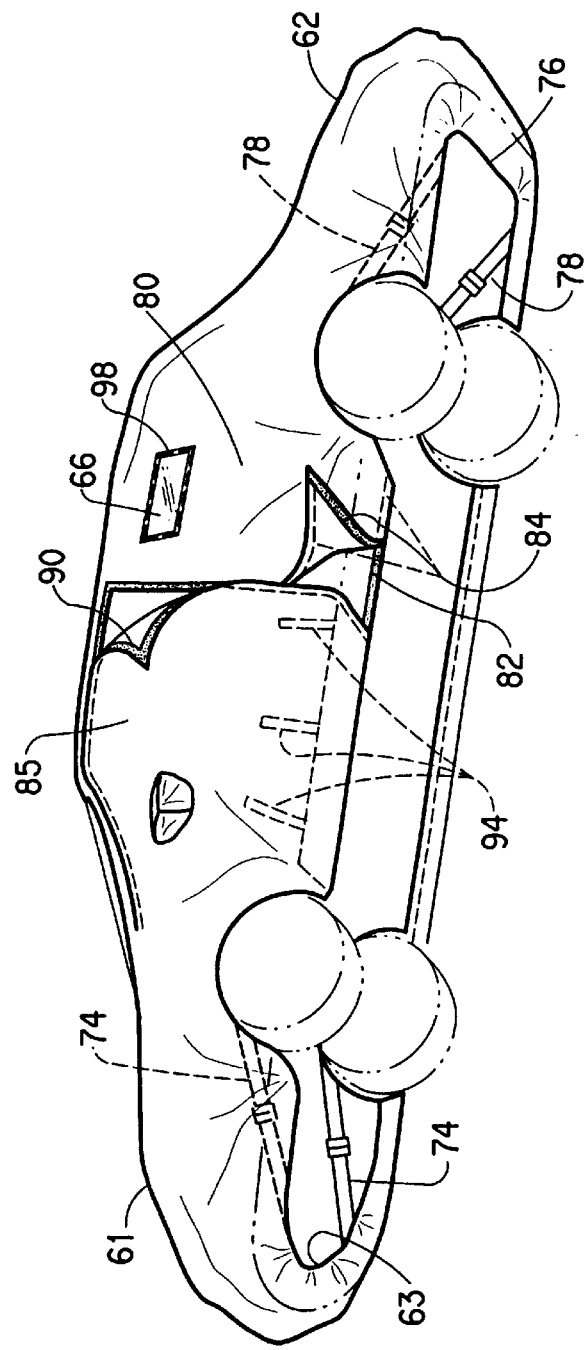

VEHICLE TRANSPORT COVER

This is a continuation-in part of application Ser. No. 08/561,764 filed on Nov. 22, 1995.

FIELD OF THE INVENTION

This invention relates to automotive vehicle covers and more particularly to covers for protecting automotive vehicles during transport from the factory to automotive dealerships and other destinations.

BACKGROUND OF THE INVENTION

After manufacture, automobiles, trucks, and other vehicles are conventionally transported from the factory to automotive dealerships and other destinations for sale or leasing to consumers. The journey from the factory typically entails transport of the vehicle by some combination of truck, train, and boat. During transport, the exterior finish of the new vehicles can be damaged by acid rain, by flying road debris such as sand, stones, and asphalt, or by flying iron filings emitted from the brakes of vehicle transport trains. The value of a vehicle with a marred exterior finish may be substantially reduced and it may be difficult to sell such a vehicle without first undertaking extensive refinishing.

Traditional one piece vehicle storage covers cannot be used as transport covers because such storage covers do not stay firmly attached when subjected to wind during transit, which can create a safety hazard. Traditional storage covers also obstruct access to the vehicle to which the covers are applied and they obscure the view of the drivers who must periodically drive vehicles on and off trucks, trains, and boats as the vehicles are transported from factory to dealership.

Vehicle manufacturers have used a variety of strategies to reduce damage to the exterior of vehicles during transport. Vehicles have been coated with waxes or resins for transport, but the removal of such coatings is time consuming and results in the generation of substantial amounts of waste. Another protective strategy has been to coat portions of vehicles with disposable protective covers. Known vehicle transport covers typically comprise sheets of film, paper, or fabric adhered to a vehicle by a wax or adhesive. While such vehicle transport covers have been found to provide some protection to vehicle exteriors, these existing transport covers also suffer from a variety of drawbacks. Existing vehicle transport covers are difficult for assembly line workers to quickly install on vehicles coming off the line. At the time of removal, many known covers require the use of hazardous or environmentally troublesome solvents to dissolve the wax or adhesive that holds the cover on the vehicle. Moisture also builds up under many known vehicle covers where it can mar vehicle exteriors. Likewise, solvents that off-gas from plastics and paints applied to vehicles can damage the vehicle exteriors when trapped under known vehicle transport covers. Finally, existing covers are not reusable and cannot easily be recycled, thus creating disposal problems for vehicle dealerships and for the municipalities in which the dealerships are located.

SUMMARY OF THE INVENTION

Accordingly, it is an object of the invention to provide a vehicle transport cover that protects a vehicle against exterior surface damage during transport, but does not trap moisture or off-gassing solvents between the cover and the vehicle exterior.

It is also an object of the invention to provide a vehicle transport cover that can be quickly and surely attached to a vehicle by just two or three people and can be readily removed from the vehicle at a dealership without resort to potentially harmful solvents.

It is another object of the invention to provided a vehicle transport cover that permits access to the vehicle such that the vehicle can be driven with the cover in place, and that also permits access to portions of the vehicle that must be inspected during transport.

Finally, it is an object of the invention to provide a vehicle transport cover that is strong and durable enough to withstand a wide variety of transport conditions, including extended periods of exposure to sunlight and the elements.

The foregoing objects of the invention are achieved by the vehicle transport cover as embodied and broadly described herein. The motor vehicle transport cover provided comprises a synthetic nonwoven sheet having a water vapor transmission rate of at least 100 g/m$^2$ in 24 hours according to ASTM standard E96, method B, having a liquid water permeability resistance expressed by a hydrostatic head pressure of at least 1 m according to AATCC standard 127, and having an Elmendorf tear strength of at least 12 Newtons. Attachment means is provided for firmly attaching the synthetic nonwoven sheet in a position on a motor vehicle that covers substantially all of the roof, hood, and front bumper of the vehicle and remains attached at air movement speeds of at least 50 mph along the major axis of the vehicle. The attachment means leaves no visible residue on the painted surface of the vehicle at the time the nonwoven sheet is removed from the vehicle. In addition, the attachment means for the vehicle transport cover can be manipulated to readily release the nonwoven sheet from the motor vehicle.

When a motor vehicle transport cover is needed only to cover those portions of a vehicle's surface that are most likely to be damaged during vehicle transport, the transport cover may be comprised of a nonwoven sheet having separate front, top, and rear sheet pieces. In such a three-piece cover, the front sheet piece substantially covers the hood and front bumper of a vehicle to which the sheet is attached, the top sheet piece substantially covers the roof of a vehicle to which the sheet is attached, and the rear sheet piece substantially covers the trunk lid and rear bumper of a vehicle to which the sheet is attached. In instances where the entire surface of a vehicle requires protection, the vehicle transport cover may comprise a single-piece transport cover that covers all of the painted surfaces of a vehicle to which the sheet is attached. Both the three-piece cover and the single-piece cover must have means for attaching the cover to the vehicle that permit portions of the cover to be removed when access to the vehicle is required and that permit quick reattachment of the cover to the vehicle. The vehicle transport cover may be made in a manner that permits substantial portions of the nonwoven sheet to be used as a vehicle transport cover more than one time.

BRIEF DESCRIPTION OF THE DRAWINGS

The accompanying drawings, which are incorporated in and constitute a part of this specification, illustrate the presently preferred embodiments of the invention and, together with the description, serve to explain the principles of the invention.

FIG. 7 is a perspective view of an embodiment of the present invention in which transparent or translucent panels cover the headlights, taillights, and backup lights of a vehicle to which the vehicle transport cover of the invention is applied.

FIG. 8 is a detailed perspective view of one of the straps of the front sheet piece of the vehicle transported cover, identified by the detail line 8 in FIG. 2, shown secured to a motor vehicle.

FIG. 9 is a detailed perspective view of one of the straps on the rear edge of the front sheet piece of the vehicle transport cover, identified by the detail line 9 in FIG. 2, shown attached to a vehicle's front door hinge.

FIG. 10 is a detailed perspective view of one of the loops on the front edge of the rear sheet piece of the vehicle transport cover, identified by the detail line 10 in FIG 2, shown hooked over a vehicle's rear door locking post.

FIG. 11 is a perspective view of an automobile to which another preferred embodiment of the vehicle transport cover of the present invention is attached.

FIG. 12 is a perspective view of the underside of an automobile to which the vehicle transport cover shown in FIG. 11 is attached.

DETAILED DESCRIPTION OF THE PREFERRED EMBODIMENTS

Figure 1:
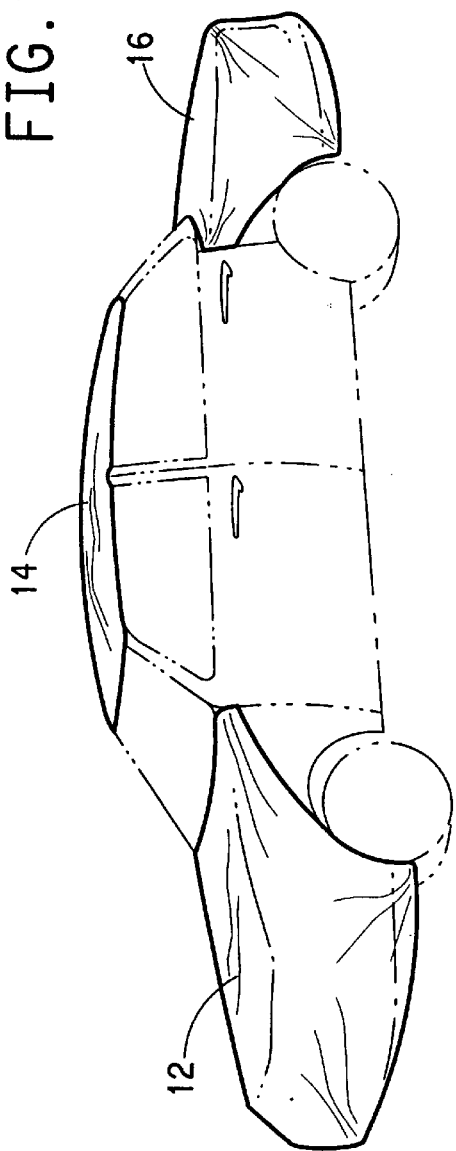
FIG. 1 shows an automobile to which a vehicle transport cover according to one preferred embodiment of the present invention is attached.

Reference will now be made in detail to the presently preferred embodiments of the invention, examples of which are illustrated in the accompanying drawings. Throughout the drawings, like reference characters are used to designate like elements. As used herein, ASTM refers to the American Society of Testing Materials, TAPPI refers to the Technical Association of the Pulp and Paper Industry, and AATTC refers to the American Association of Textile Chemists and Colorists.

FIG. 1 shows an automobile to which a multiple section motor vehicle transport cover of the present invention has been applied. According to this embodiment of the invention, a nonwoven sheet is attached to a vehicle in a manner that covers the portions of a vehicle exterior that are most vulnerable to transport damage, namely the vehicle's front bumper, the grill, the hood and the roof. In the embodiment of the invention shown in FIG. 1, the nonwoven sheet is divided into separate sheet pieces. A front sheet piece 12 covers the hood, front bumper fascia and grill of a vehicle to which the transport cover is attached. A top sheet piece 14 covers the roof of a vehicle to which the cover is attached. For sedan-type vehicles, a rear sheet piece 16 can be applied over the trunk and rear bumper of the vehicle to which the transport cover is attached.

FIG. 11 shows an automobile to which a full coverage motor vehicle transport cover of the present invention has been applied. According to this embodiment of the invention, a nonwoven sheet 60 is attached to a vehicle in a manner that covers substantially all of the finished exterior portions of a vehicle exterior. In the embodiment of the invention shown in FIG. 11, the nonwoven sheet does not cover the front windshield and one or more view ports are cut out from sections of the cover that correspond to other windows of a vehicle to which the cover is applied. A flap 86 is provided for giving a driver access to the vehicle to which the transport cover is applied.

According to the invention, the sheet material of the vehicle transport cover invention embodiments shown in FIGS. 1 and 11 is comprised of a synthetic nonwoven material. The sheet material should be vapor-permeable (i.e., the sheet should have a water vapor transmission rate of at least 100 g/m$^2$ in 24 hours according to ASTM standard E96, method B). The sheet material should also be liquid-water-impermeable (i.e., the sheet should have a liquid water permeability resistance expressed by a hydrostatic head pressure of at least 1 m according to AATCC standard 127). It is also important that the sheet have a tear strength of at least 12 Newtons according to the Elmendorf Tear Strength test. Elmendorf tear strength is a measure of the force required to propagate a tear cut in a sheet and is measured in accordance with the following standard methods: TAPPI-T-414 om-88 and ASTM D 1424. Finally, it is preferred that the sheet material not be abrasive to a vehicle exterior and that the sheet material be launderable.

Particularly well suited to the invention are sheets of spunbonded nonwoven polyolefin film-fibrils of the type disclosed in U.S. Pat. No. 3,169,899 or vapor-permeable fabric sheets of the type disclosed in U.S. Pat. No. 4,684,568, the contents of which are both incorporated by reference herein. Polyethylene and polypropylene are the polyolefins of choice. A commercial spunbonded nonwoven polyethylene film-fibril sheet product that is particularly suitable to the vehicle transport cover of the invention is TYVEK® spunbonded polyolefin sheet sold by E. I. du Pont de Nemours and Company of Wilmington, Del. TYVEK® is a registered trademark of DuPont. TYVEK® spunbonded polyolefin sheets are lightweight and have outstanding mechanical properties while also having good tolerance to ordinary weather conditions.

A particularly preferred sheet product for use in the invention is TYVEK® 1461-L sheet, due to its advantageous moisture vapor transmission rate which has been measured using ASTM E-96, Method B to be between 600 and 1100 g/m$^2$ in 24 hrs. TYVEK® 1461-L sheet has a liquid water permeability resistance expressed by a hydrostatic head pressure of 1.6 m according to AATCC standard 127. TYVEK® 1461-L sheet has a thickness of between 0.1 and 0.25 mm and a basis weight of about 59 g/m$^2$. The Elmendorf tear strength for TYVEK® 1461-L sheet is between 13.8 and 15.1 Newtons. TYVEK® 1461-L sheet is made of high density polyethylene, making it readily recyclable. In addition, TYVEK® 1461-L sheet can be readily printed with advertising or other information and it can also be laundered repeatedly.

Figure 2:
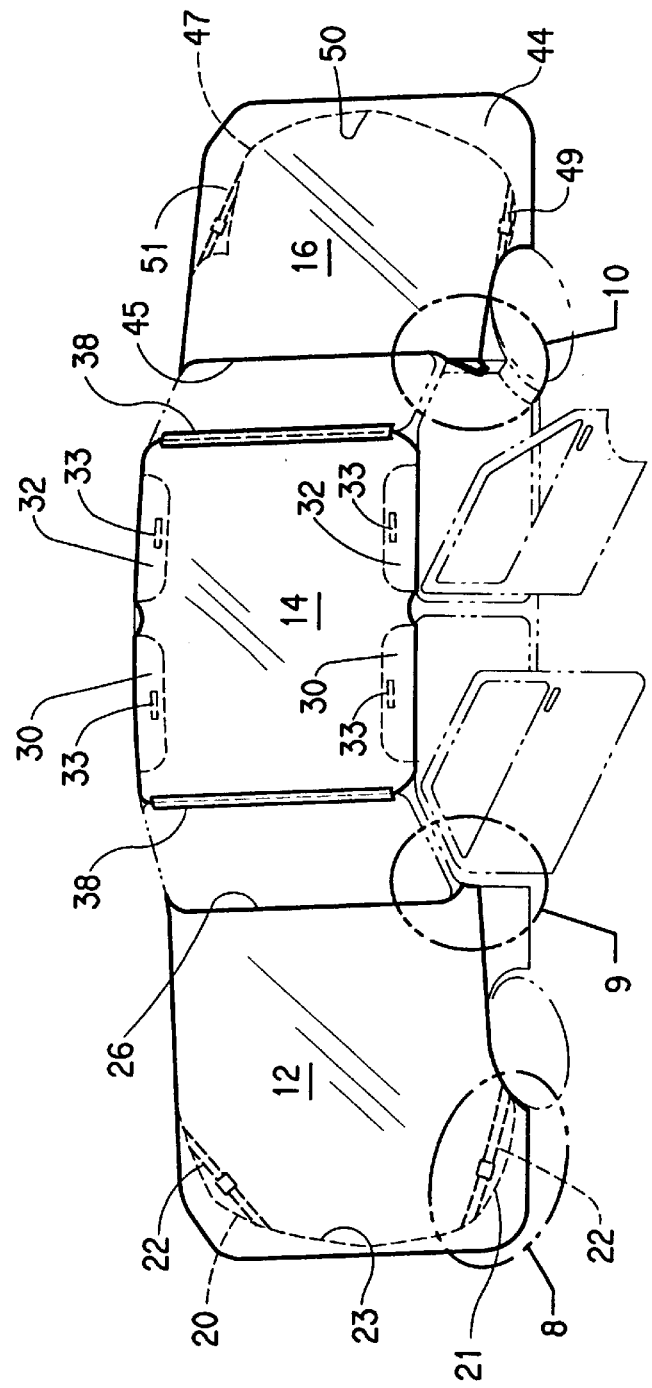
FIG. 2 is a perspective view of the vehicle transport cover of FIG. 1 shown as it would be attached to a motor vehicle.

FIG. 2 shows the multiple section vehicle transport cover embodiment of FIG. 1 as it would be applied to an automobile sedan. Front sheet piece 12 is cut and assembled such that the piece can be snugly attached over a vehicle's hood and front bumper fascia without the use of adhesives. In order to attach the front sheet piece 12 to a vehicle, the front portion of sheet piece 12 is pulled over the vehicle's front bumper. The front portion of front sheet piece 12 is cut and seamed such that it fits over and conforms to the contours of the vehicle's hood and front bumper fascia. The front edge of front sheet piece 12 may be held in place under the front bumper fascia by elastic attached along the sheet edge. Once the front portion of front sheet piece 12 is pulled over the bumper of the vehicle to which the transport cover is being applied, the rear edge 26 of the front sheet piece is attached to the vehicle along the edge of the hood that abuts the vehicle's windshield. In the preferred embodiment of the invention shown in FIG. 3, two straps 24 extend from opposite ends of the reinforced rear edge 26 of front sheet piece 12 and are attachable to the front door hinges on opposite sides of the vehicle. Straps 24 may be designed to hook or tie directly to the door hinges, or they may go around the door hinges and attach to a second strap or loop 25 extending from the edge of front sheet piece 12. This attachment may be by means of hooks, snaps, clips, ties, or hook and loop fasteners such as VELCRO® releasable hook and loop fastening strips. VELCRO® is a registered trademark of Velcro U.S.A. Inc. In the embodiment of the invention shown in FIGS. 3 and 9, the loops on the end of the straps 24 are designed to be threaded around the top front door hinge of a vehicle to which the transport cover is applied and then attached to a corresponding loop 25 by means of a self-locking nylon or polypropylene tie or a plastic cable lock 29.

Figure 3:
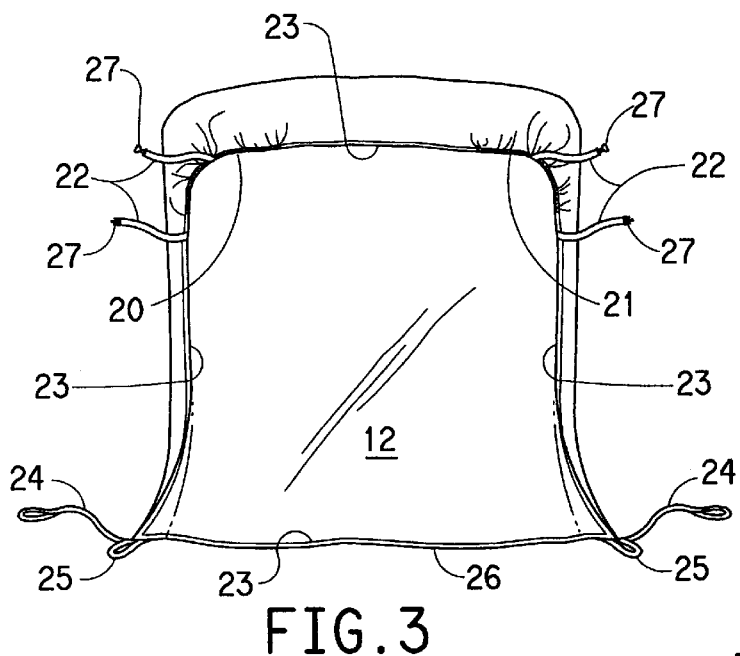
FIG. 3 is a plan view of the underside of the front sheet piece of the vehicle transport cover shown in FIG. 2.

According to the embodiment of the invention shown in FIG. 3, elastic cord sections 20 and 21 are attached along the opposite corners of the front edge of front sheet piece 12. As shown in FIG. 3, elastic cord sections 20 and 21 may be sewn into the front edge of the front sheet piece. Lengths of inelastic reinforcing cord 23 are preferably sewn into the center section of the front edge of front sheet piece 12 between the elastic cord sections 20 and 21 and into the other nonelastic edges of front sheet piece 12. If the bottom edge of the front bumper fascia of the vehicle to which the cover is attached has a lip or a sharply angled contour, snug fitting elastic bands 20 and 21 may be sufficient to hold front sheet piece 12 in place on a vehicle. Otherwise it may be necessary to attach the front sheet piece 12 to the underside of the vehicle front bumper fascia by hooks, straps, snaps, or latches that attach the front edge of the front sheet piece to the vehicle frame, by pairs of elastic or nonelastic locking straps attached to the edge of front sheet piece 12, by separate straps that wrap around the front end of the vehicle to which the cover is attached, or by some combination thereof. Preferably, such attachments are readily releasable and reattachable to permit access under the hood of a vehicle to which the transport cover is attached.

As shown in FIGS. 2, 3, 8, and 12, locking strap pairs may be provided for securely fastening the cover on a vehicle. The straps of the strap pairs may be either elastic or nonelastic bands. As shown in the embodiment of the invention shown in FIGS. 2 and 3, the straps may comprise strap pairs 22 each have locking members 27 at their ends such that the free ends of the straps of each strap pair can be releasably locked to the other strap of the pair. As best seen in FIGS. 2 and 8, the strap pairs 22 can be attached under the opposite front wheel wells and front corners of the front bumper fascia of a vehicle to which the transport cover is attached. The nonextendible reinforcing cord 23 sewn into the center of the front edge of front sheet piece 12 helps secure the front edge of front sheet piece 12 under the bumper fascia when the strap pairs 22 are locked. When so secured, blowing air does not get under the front sheet piece and pull the sheet off. Strap pairs 22 may, in an alternative embodiment of the invention, be replaced with lengths of elastic cord attached to the front sheet piece 12 at substantially the same attachment points as shown for the straps of strap pairs 22 in FIGS. 3 and 8. In another alternative embodiment of the invention, an additional pair of locking straps could be secured to the center of the front edge of front sheet piece 12 between the pairs of locking straps 22 to help secure the front edge of front sheet piece 12. With the attachment mechanisms described above, front sheet piece 12 may be releasably secured over the hood and front bumper fascia of a vehicle without the use of adhesives such that front sheet piece 12 can be used repeatedly. In addition, the absence of adhesive on the sheet material makes the front sheet piece more easily recyclable at the end of the piece's useful life.

Figure 4:
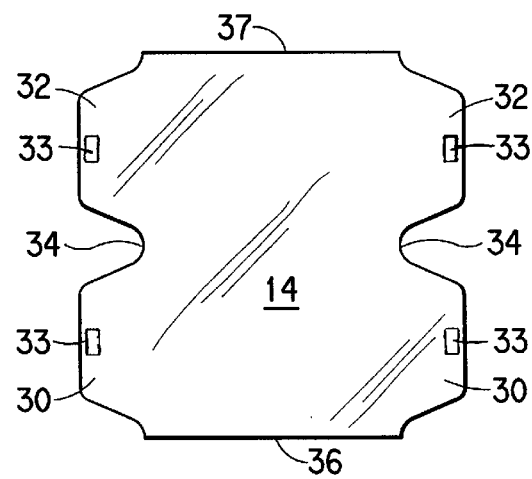
FIG. 4 is a plan view of the underside of the top sheet piece of the vehicle transport cover shown in FIG. 2.

The top sheet piece 14 of the multiple piece transport cover is best shown in FIGS. 2 and 4. As can be seen in FIG. 4, top sheet piece 14 comprises a flat sheet of the nonwoven material of the type described above. Top sheet piece 14 is cut with a front edge 36, a rear edge 37, and sets of opposite side flaps 30, 32 corresponding to the number of doors on each side of the vehicle. Front edge 36 of top sheet piece 14 extends to at least the top edge of the windshield of a vehicle to which the vehicle transport cover of the invention is attached. As best seen in FIG. 2, side flaps 30 and 32 fold inside the vehicle's doors and are attached to the inside roof of the vehicle to which the cover is attached by tape strips, hooks, or VELCRO® releasable hook and loop fastening strips 33. The side cutout portions 34 correspond to the roof support post between the front and rear doors of a sedan-type vehicle to which the vehicle transport cover is attached. The strips 33 hold the top sheet piece out of the way of drivers or other persons who must get in and out of the vehicle to which the cover is attached. Upon closing the side doors of the vehicle to which the transport cover is attached, the top sheet piece 14 is locked firmly in place on the vehicle's roof. When the top sheet piece is to be attached to a vehicle with just one swinging side door on each side, as, for example, with a hatchback, pickup truck, or van, then the top sheet piece is made with just one side flap on each of its sides.

A strip of adhesive tape 38 is used to attach the front edge 36 of top sheet piece 14 to the top of the windshield of the vehicle to which the vehicle transport cover of the invention is applied. In order for the adhesive to hold top sheet piece 14 in place, it is important that the sheet piece be made from a material with a high delamination strength. Preferably, top sheet piece 14 has a delamination strength of at least 0.3N/25 mm. Delamination of a sheet sample is measured using a constant rate of extension tensile testing machine such as an Instron table model tester. In order to measure delamination strength, a 1.0 in (2.54 cm) by 8.0 in (20.32 cm) sample is delaminated approximately 1.25 in (3.18 cm) by inserting a pick into the cross section of the sample to initiate a separation and delamination by hand. The delaminated sample faces are mounted in the clamps of the tester which are set 1.0 in (2.54 cm) apart. The tester is started and run at a crosshead speed of 5.0 in/min (5.08 cm/min). The computer starts picking up readings after the slack is removed after about 0.5 in of crosshead travel. The sample is delaminated for about 6 in (15.24 cm) during which 3000 readings are taken and averaged. The average delamination strength is given in lbs/in (N/mm). The test generally follows the method of ASTM D 2724-87.

According to the invention, the front edge 36 of top sheet piece 14 is taped to the windshield of the vehicle to which the cover is applied in a manner that prevents wind from getting under the top sheet piece. A second strip of tape 38 may be applied to rear edge 37 of top sheet piece 14 and to the rear window of a vehicle to which the car transport cover of the invention is attached. When the vehicle transport cover is to be applied to vehicles without trunks or to vehicles with just one side swinging door on each side, such as utility vehicles, vans, hatchbacks, or station wagons, it may be especially important to tape the rear edge of top sheet piece 14 to the rear window of the vehicle. In one embodiment of the invention, the front edge 36 and rear edge 37 of sheet piece 14 can be configured so as to extend as much as one third of the way down the windshield and rear window of a vehicle to which the vehicle transport cover is applied. This extra length permits the portions of the top sheet piece to which adhesive tape has been applied to be cut off upon removal of the sheet piece while leaving enough of the top sheet piece 14 to permit one or more reuses.

The adhesive tape strip 38 used to secure the top sheet piece 14 to the glass of the vehicle to which the vehicle cover is to be applied may be a single- or double-sided tape. The adhesive that sticks to the vehicle glass should peel cleanly from the vehicle glass without leaving any visible residue. The tape must also be stable over the full range of temperatures to which a vehicle in transport might be exposed (−40° C. to 65° C.). Finally, in order to reduce adhesive breakdown, the tape should be substantially opaque to UV radiation.

According to a preferred embodiment of the invention, the adhesive tape used to attach the top sheet piece to a vehicle is a single-sided tape having one band coated with an aggressive pressure sensitive permanent adhesive that adheres well to a nonwoven surface and another band coated with a less aggressive removable adhesive. The aggressive adhesive band attaches to the edge of the top sheet piece 14 and the less aggressive adhesive band attaches to the vehicle glass. The aggressive band of adhesive should have a peel strength on top sheet piece 14 that is at least 10N/25 mm. The peel strength of the less aggressive adhesive on glass should be sufficient to withstand anticipated wind forces, i.e. at least 7N/25mm.

Peel strength of the adhesives on glass is measured according to standard method PSTC-1 of the Pressure Sensitive Tape Council. Further to this method, the peel strength on a substrate is measured by first mounting the pressure sensitive adhesive tape on a substrate panel. One end of a sample of the pressure sensitive adhesive tape, 1 inch×12 inches (2.54 cm×30.5 cm), is touched to the panel. A 4.5 lb (2.05 kg) roller is used to apply the tape to the panel, rolling once in each lengthwise direction. The sample is tested immediately, within one minute of preparation. The peel strength is measured using a constant rate of extension tensile machine such as an Instron table model tester. The free end of the tape which was held during rolling is doubled back at an angle of 180 degrees and 1 inch of the tape is peeled by hand from the panel. The end of the panel, corresponding to the end where the peel has been initiated, is mounted in the bottom clamp and the free end is mounted in the top clamp. The tester is started and run at a crosshead speed of 12 inches (30 cm) per minute. The pull values obtained while peeling the first inch of the tape from the panel are disregarded and the pull values obtained while peeling the next 2 inches are averaged to give the adhesion peel strength. The peel strength is reported in N/mm. A modification of method PSTC-1 is used to measure the peel strength of a tape adhered to a nonwoven surface. A 0-degree shear peel strength from a nonwoven surface was measured because the 180 degree test results in delamination of the nonwoven substrate. According to the modified test, one end of a 1 inch×8 inches (2.54×20.3 cm) piece of pressure sensitive adhesive tape is adhered to a 1 inch×8 inches (2.54×20.3 cm) strip of the nonwoven material such that 2 inches of the adhesive tape overlaps the nonwoven strip. A 4.5 lb (2.05 kg) roller is rolled over the 2 inch overlapped area once in each direction. The ends of the strip are placed in opposing jaws of an Instron tester such that about 6 inches of the strip including the 2 inch overlap are between the jaws which are set 6 inches apart. The test then proceeds as in the Delamination test described above. The maximum stress before failure is taken as the 0-degree shear peel strength of the tape. If the failure is outside of the 1 inch overlap area the result is noted as a tensile break of the nonwoven material or the tape. The strength is reported in N/25 mm.

Figure 6:
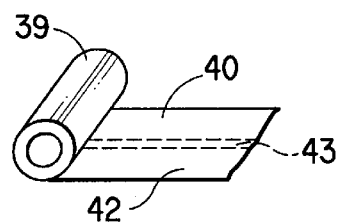
FIG. 6 is a perspective view of the adhesive tape used with the top sheet piece of the vehicle transport cover shown in FIG. 4.

As shown in FIG. 6, a tape roll 39 may be provided with a band of aggressive permanent adhesive 40 and a band of less aggressive removable adhesive 42 that is separated from the aggressive adhesive by a clear band 43 coated with no adhesive. The adhesive-free band makes it possible to use the adhesive tape to quickly secure top sheet piece 14 to vehicle roofs. The less aggressive adhesive may be an adhesive that remains tacky after use such that the top sheet piece 14 can be easily repositioned on a vehicle and can be reused on subsequent vehicles without requiring new tape. One such double banded tape is Type CA-867 tape sold by Specialty Tapes of Racine, Wis. It has also been found that a double-sided tape with a permanent pressure sensitive adhesive on one side for adhering to the top sheet piece and a less aggressive adhesive on the opposite side for attaching to the vehicle glass can be advantageously used to apply the top sheet piece 14 of the vehicle transport cover of the present invention to a vehicle. One such double-sided tape is Type 8300 tape sold by Fasson Specialty Tape Division of Avery Dennison Corporation of Painesville, Ohio. When a double-sided tape is used, the delamination strength of the sheet 14 should be at least 0.6N/25 mm.

When the vehicle transport cover of the invention is applied to a vehicle with a trunk, as shown in FIG. 2, a rear sheet piece 16, assembled such that the piece can be snugly attached over a vehicle's trunk lid and rear bumper without the use of adhesives, may be attached to the vehicle. Preferably, rear sheet piece 16 is made from the nonwoven sheet material described above. In order to attach the rear sheet piece 16 to a vehicle, the rear portion of the sheet piece 16 is pulled over the vehicle's rear bumper. The rear portion of sheet piece 16 is cut and seamed such that it fits over and conforms to the contours of the vehicle's rear bumper. Once the rear portion of rear piece 16 is pulled over the bumper of a vehicle to which the transport cover is being applied, the front edge 45 of the rear sheet piece 16 is attached to the vehicle along the edge of the trunk lid that abuts the vehicle's rear window. In the preferred embodiment of the invention shown in FIGS. 2 and 5, two loops 46 extend from opposite ends of the reinforced front edge 45 of rear sheet piece 16 and are attachable around rear door locking posts on opposite sides of the vehicle. Alternatively, loops 46 could be replaced with straps, hooks, clips, ties, or releasable hook and loop fastening strips.

The rear edge of the rear sheet piece 16 may be held in place under the rear bumper by elastic attached along the sheet edge, by hooks, straps, or latches that attach to the vehicle frame, by pairs of elastic or nonelastic locking straps attached to the edge of rear sheet piece 16, by separate straps that wrap around the rear end of the vehicle to which the cover is attached, or by some combination thereof. According to the preferred embodiment of the invention shown in FIG. 5, elastic cord sections 44 and 47 are attached to the rear edge of rear sheet piece 16. Elastic cord sections 44 and 47 may be lengths of elasticized cord sewn into the rear edge of the rear sheet piece. A length of nonelastic reinforcing cord 50 is preferably sewn into the center of the rear edge of rear sheet piece 16 between the elasticized cord sections 44 and 47 and into the remaining edges of the rear sheet piece.

If the bottom edge of the rear bumper of the vehicle to which the cover is attached has a lip or sharply angled contour, snug fitting elastic bands 44 and 47 may be sufficient to hold the rear sheet piece in place on the vehicle. Otherwise, it may be necessary to hook, strap, or snap the rear edge of rear sheet piece 16 to the underside of the rear bumper. Preferably, such attachments are readily releasable and reattachable to permit access to the trunk of a vehicle to which the transport cover is attached during transport of the vehicle. In the preferred embodiment of the invention shown in FIGS. 2 and 5, pairs of locking straps 49 and 51 are provided for securely fastening the rear sheet piece 16 on a vehicle. Straps of strap pairs 49 and 51 may be either elastic or nonelastic bands. The straps of strap pairs 49 and 51 each have locking members at their ends such that the free ends of the straps of each strap pair can be releasably locked to the other strap of the pair. In an alternative embodiment of the invention, an additional pair of locking straps could be secured to the center of the rear edge of rear sheet piece 16 between the pairs of locking straps 49 and 51 to help secure the rear edge of sheet piece 16 to a vehicle.

As can be seen in FIG. 2, the strap pairs 49 and 51 can be attached under the opposite rear wheel wells and rear corners of the rear bumper of a vehicle to which the transport cover of the invention is attached in a manner similar to that shown in FIG. 8. When so secured, blowing air does not get under the rear sheet piece and pull the piece off. Strap pairs 49 and 51 may, in an alternative embodiment of the invention, be replaced with lengths of elastic cord attached to the rear sheet piece 16 at substantially the same attachment points shown for the straps of strap pairs 49 and 51 in FIG. 5. With the attachment mechanisms described above, rear sheet piece 16 may be releasably secured over the trunk lid and rear bumper without the use of adhesives, and therefore the rear sheet piece can be reused repeatedly. In addition, the absence of adhesive on the sheet material makes the rear sheet piece more easily recyclable at the end of its useful life.

In one embodiment of the invention, front sheet piece 12' and rear sheet piece 16' can be made with translucent panels arranged to correspond with the headlights, taillights, and/or backup lights of a vehicle to which the vehicle transport cover of the present invention is attached. Such panels permit a vehicle to which the transport cover has been applied to be driven at night or in dark places without removing the cover. As shown in FIG. 7, transparent or translucent panels 28 in front sheet piece 12' permit the headlights of a vehicle under the vehicle transport cover of the invention to shine through the cover. Likewise, transparent or translucent panels 48 in rear sheet piece 16' permit the rear taillights, and backup lights to be seen through the vehicle transport cover of the present invention. The transparent panels may be portions of the sheet material that have been made transparent by heat treatment, or the panels may be sections of a transparent or translucent material that have been sewn into the cover, or have been taped, thermally bonded, or radio frequency welded into the cover. For example, the translucent panels may be made by radio frequency welding a second layer of the same high density polyethylene that comprises the cover material over the portions of the cover where translucence is desired such that the cover material remains 100% highly recyclable high density polyethylene.

According to a second preferred embodiment of the invention, a vehicle transport cover is provided for protecting substantially all of the finished surfaces of a vehicle. As shown in FIGS. 11–16, a unitary cover 60 is made of a lightweight synthetic nonwoven sheet material as described above. The cover 60 is cut and seamed so as to closely fit over the motor vehicle model to which the cover is to be applied. The pieces of sheet material that make up cover 60 are conventionally sewn together, but may alternatively be sonically or thermally bonded. Cover 60 has a front end 61 and a rear end 62 that conform to the contours of front and rear sections of the motor vehicle to which the cover is applied. Cover 60 can be made with pockets 68 that fit over the side mirrors of a vehicle. Cover 60 is preferably made with a large elongated opening 64 that fits over the windshield of a vehicle to which the cover is attached. The opening 64 has a top opening edge configured to correspond to a top edge of the windshield of the covered vehicle and side opening edges configured to correspond to opposite sides of the windshield of the covered vehicle. The top and side opening edges of the opening 64 may be trimmed with adhesive tape for attaching to the windshield of the covered vehicle. The adhesive tape may be a single sided adhesive tape with two bands of adhesive, the first of which is a high strength adhesive that attaches to the nonwoven sheet with an adhesive strength of at least 10N/25 mm, and the second of which attaches to the windshield of the vehicle with an adhesive strength in a range of 6 to 10N/25 mm. View openings 66 can also be cut into the cover where the cover fits over the rear and side windows so as to improve the visibility of a driver of the covered vehicle.

Front section 61 of cover 60 can be attached over the hood and front bumper fascia of a vehicle in a manner similar to that described above for the front sheet piece 12 of the embodiment of the invention shown in FIGS. 2 and 3. Front section 61 of cover 60 is cut and assembled such that it can be snugly attached over a vehicle's hood and front bumper fascia without the use of adhesives. The front section 61 fits over and conforms to the contours of the vehicle's hood and front bumper fascia. The rear edge 65 of the front section 61 aligns with the edge of a vehicle's hood that abuts its windshield. Rear edge 65 is preferably formed such that the front section 61 of cover 60, when applied to a vehicle, is forward of the vehicle's windshield wipers where the cover will not interfere with movement of the wipers. In the embodiment of the invention shown in FIG. 1 1, rear edge 65 is reinforced and has two straps 70 and 71 that extend from each end of the reinforced rear edge 65. The straps 70 and 71 are preferably configured to attach around a vehicle's side mirror support arms. The straps may be configured as a single strap that wraps around a vehicle's side mirror support arm and hooks to itself or as two straps with a releasable locking mechanism such as hooks, clips, ties, or a buckle that can be locked after being wrapped around the side mirror support arms of a vehicle. Alternatively, the pairs of straps 70 and 71 at each end of the rear edge 65 may be made attachable to a vehicle's upper front door hinges on opposite sides of the vehicle in a manner like that described above for the straps 24 and 25 of the multiple piece transport cover, as shown in FIG. 9.

In order to attach the front cover section 61 to a vehicle, the two sets of strap pairs 70 and 71 are first attached to the side mirror support arms on the opposite side of a vehicle in order to fix rear edge 65 of the cover's front section 61 in place on the vehicle. Next, the front edge 63 of front cover section 61 is pulled over the vehicle's front bumper. The front edge 63 of front cover section 61 is initially held in place under a vehicle's front bumper by elastic attached to the cover's front edge 63. The front section 61 of the vehicle transport cover 60 may be fixed in place by hooks, straps, snaps, or latches that attach the front cover section 61 to the vehicle frame. Preferably, elastic or nonelastic locking straps attach to the front edge 63 of front section 61, and serve to hold the front section 61 of the cover 60 in place during vehicle transport. Straps 74 should be readily releasable and reattachable to permit access to the front body panels and under the hood of a vehicle to which the transport cover is attached. In the preferred embodiment of the invention shown in FIGS. 11 and 12, the locking straps comprise nonelastic strap pairs 74 like the strap pairs 22 described above with reference to FIGS. 2 and 3. The straps of the strap pairs may be attached to the front edge 63 of front cover section 61 at a spacing of more than six inches from each other. In addition, front section 61 may be made with openings 100 through which a vehicle's windshield wiper fluid nozzles may protrude such that cleaning fluid may be sprayed from the nozzles during vehicle transport without removing the cover. The openings 100 may be substantially round and have a diameter of less than one inch.

Figure 5:
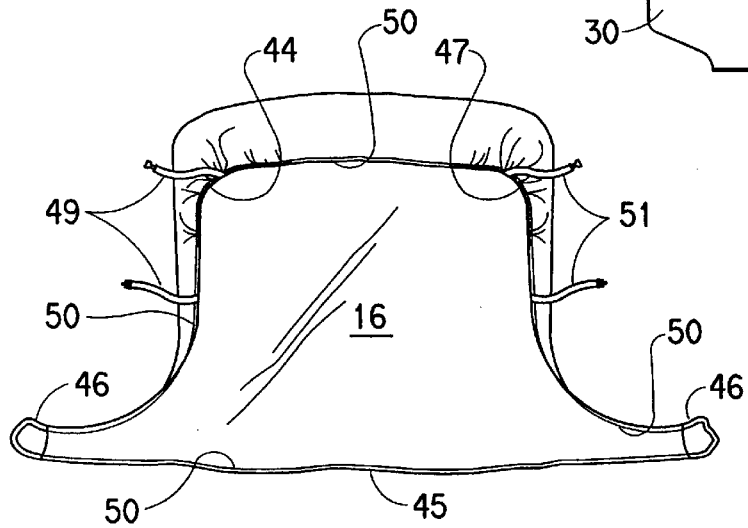
FIG. 5 is a plan view of the underside of the rear sheet piece of the vehicle transport cover shown in FIG. 2.

Rear section 62 of cover 60 can be attached over the trunk and rear bumper of a sedan-type vehicle or over the backdoor and rear bumper of station wagons, sport utility vehicles, or hatchbacks in a manner similar to that described above for the rear sheet piece 16 of the embodiment of the invention shown in FIGS. 2 and 5. Rear cover section 62 of cover 60 is cut and assembled such that it can be snugly attached over the rear bumper of a vehicle without the use of adhesives. In order to attach the rear cover section 62 to a vehicle, the rear edge 76 of cover 60 is pulled over the vehicle's rear bumper. The rear section 62 of cover 60 is cut and seamed such that it fits over and conforms to the contours of a vehicle's rear portion and rear bumper. When the unitary cover 60 is attached to a vehicle, the rear section 62 is pulled over the vehicle after the front section 61 is attached to the vehicle. Once the front section 61 is attached to the vehicle, the rear edge 76 of rear section 62 is pulled over the rear portion and rear bumper of the vehicle. Rear edge 76 is initially held in place under the rear bumper by elastic attached along the sheet's rear edge 76. Rear edge 76 is subsequently fixed in place by hooks, straps, snaps, or latches that attach the rear edge 76 to the vehicle frame, by elastic or nonelastic locking straps attached along the rear edge 76 of the rear cover section 62, by separate straps that wrap around the rear portion of the vehicle to which the cover is attached, or by some combination thereof. Preferably, of readily releasable and r by means of readily releasable and reattachable straps 78 so as to permit access to the rear body panels and into the trunk or rear door of a vehicle to which the transport cover 60 is attached. In the preferred embodiment of the invention shown in FIGS. 11 and 12, locking strap pairs 78 are like the strap pairs 49 and 51 described above with reference to FIGS. 2 and 5.

According to the embodiment of the invention shown in FIGS. 11 and 12, the vehicle transport cover 60 has a middle section that covers the roof and side panels of a vehicle to which the cover is applied. The bottom of each side 80 of the middle section of the cover 60 is attached under the bottom edges of a vehicle with a releasable locking mechanism that permits the cover to be readily removed from and reattached to the side panels so as to permit quick inspection of the vehicle's side panels during transport. In the embodiment of the invention shown in FIGS. 11 and 12, the locking mechanism comprises interlocking hook and loop fastening strips, such as Velcro® strips, wherein a strip 84 is adhered to the bottom side edge of cover 60 where it can engage a complementary strip 82 that is adhered to the edge of the underside of a vehicle. Strip 84 can be attached to the cover 60 by any known means such as sewing or adhesive bonding.

When the cover 60 is first placed over a vehicle, the locking strip 82 to be attached to the underside of the vehicle is engaged to complementary locking strip 84 on the cover. An adhesive on the back side of locking strip 82 is covered with a removable release tape. During installation of the cover 60, the releasable tape strips are removed from the back of the locking strips 82 once the cover 60 is in place on the vehicle. The adhesive on the strips 82 adheres to the bottom of each side edge of cover 60 to the underside of the vehicle on which the cover is installed. After the initial installation, the cover can be released by separating locking strip 84 from locking strip 82. On the passenger side of the cover, the hook and loop locking strips preferably extend substantially the full length between the vehicle's front and rear wheel wells. On the driver's side of the cover, the hook and loop locking strips extend along the portions of the bottom edge of the cover that correspond to the area between the rear wheel well and the driver's side door of the covered vehicle and to the area between the front wheel well and the driver's side door. Alternatively, the bottom side edges of the cover 60 can be attached to the underside of a vehicle by a releasable adhesive tape. In addition the cover may be made with flaps that attach, either with tape or hook and loop locking strips, to a vehicle's front wheel wells to prevent wind from getting under the cover during transport.

Figure 14:
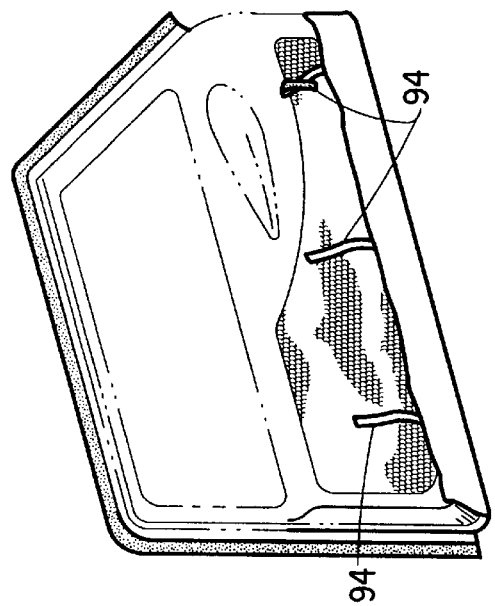
FIG. 14 is a perspective view showing a portion of the vehicle transport cover of FIG. 11 attached to the inside of a vehicle's driver's side door.
Figure 13:
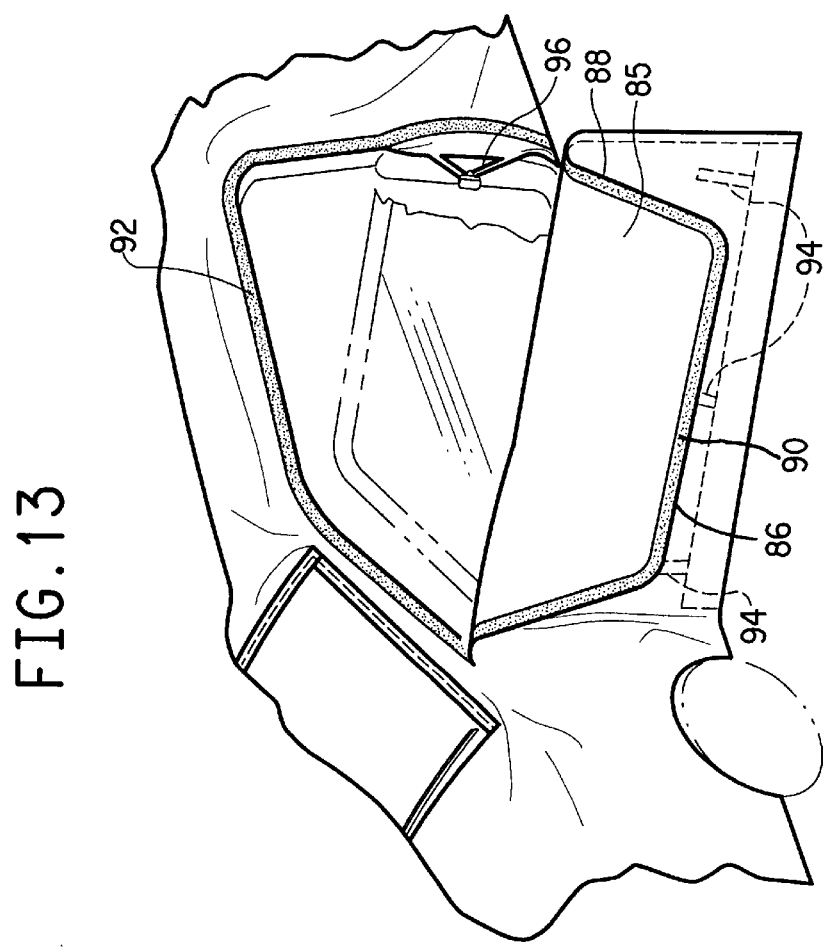
FIG. 13 is a detailed perspective view of a section of one side of the vehicle transport cover of FIG. 11 shown with the driver's side door in an open position.

The driver's side of the vehicle transport cover has a releasable flap to permit a driver to enter a covered vehicle without removing the cover from the vehicle. As best shown in FIGS. 13 and 14, a flap 85 is provided on the driver's side of the cover that permits the driver's side door of a covered vehicle to be opened without removal of the vehicle transport cover. Flap 85 has a front edge that corresponds to a hingeline of the driver's door of the vehicle to which the transport cover is attached. Flap 85 has top and bottom edges that generally correspond to a top edge and a bottom edge of the driver's door to which the transport cover is attached, and a back edge that corresponds to a rearward edge of the vehicle's door, which rearward edge is opposite the door's hingeline. When not in use, flap 85 is held in a closed position by a releasable locking mechanism such as a zipper, hook and loop locking strips, or releasable adhesive tape strips. As can be seen in FIG. 13, the top edge 86 and rearward edge 88 of flap 85 preferably have a hook and loop locking strip 90 that attaches to a complementary locking strip 92 on the adjoining portion of the cover. The bottom of flap 85 is held in place by folding the bottom edge of flap 85 under the driver's door of the vehicle to which the cover is applied and closing the door. As best shown in FIG. 14, hooked locking strips 94 are provided for attaching to the carpet on the inside of a vehicle door and holding the bottom edge of the flap in place while the door is being closed. If the transport cover is to be applied to a vehicle in which the inside surface of the driver's door is not carpeted, pressure sensitive tape may be used to attach the cover to the door. Alternatively, a pair of hooked and looped fastener strips with an adhesive on each strip's nonlocking side, similar to the strips 82 and 84, can be used to releasably attach the bottom of flap 85 to the base of a vehicle's driver's side door. As can be seen in FIG. 11, flap 85 can be left partially open so as to give a driver of the covered vehicle side visibility. To help secure the portion of the cover 60 to the rear of flap 85 to a vehicle, a loop 96 on the edge of cover 60 is provided that fits over the driver's door locking post of a vehicle to which the cover is attached.

Figure 15:
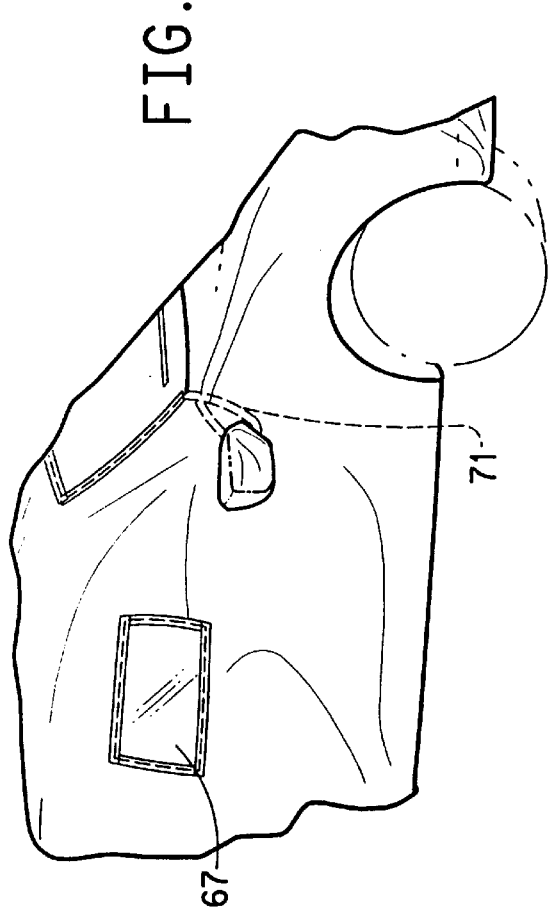
FIG. 15 is a perspective view of a section of an automobile to which the vehicle transport cover shown in FIGS. 11 and 12 is attached, as viewed from the passenger side of the vehicle.
Figure 16:
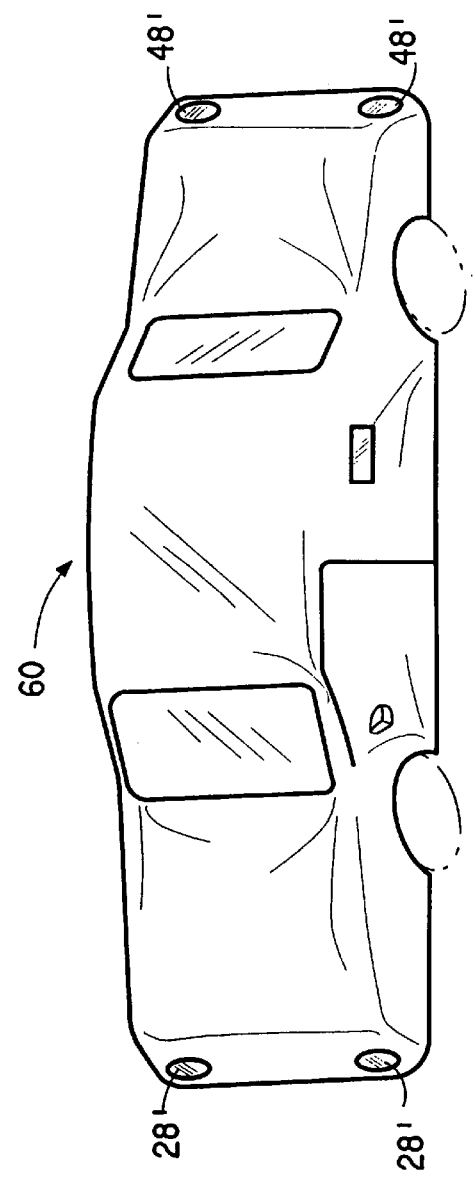
FIG. 16 is a perspective view of an alternative embodiment of the vehicle transport cover shown in FIG. 11, in which transparent or translucent panels in the transport cover are positioned over the headlights and taillights of the vehicle to which the vehicle transport cover of the invention is applied.

Cover 60 can be made with additional openings, or additional openings, like the opening 66 shown in FIG. 11, may be cut into the cover 60 after the cover has been placed on a vehicle. For example, openings can be cut over the vehicle headlights and/or taillights. Such openings may be made with translucent panels 28' and 48', as described with respect to FIG. 7 and as shown in FIG. 16. Similar opening may be cut in the portions of cover 60 that corresponds to the passenger side window or rear windows of a vehicle so as to improve a driver's rear and side visibility. Such openings may be covered with transparent panels. An opening 67 corresponding to the passenger side window of the covered vehicle is shown in FIG. 15. Alternatively, openings may be cut into the cover 60 after placement of the cover on a vehicle, and the free edges of the cut opening may be taped to the underlying window using pressure sensitive tape pieces 98 like the adhesive tapes described above. In order to avoid delamination of the cover in the area of such openings, the sheet should have a delamination strength of at least 0.3N/25 mm.

The vehicle transport covers of the present invention can be quickly and securely applied to a vehicle coming off an assembly line by just two people. In application trials, it was found that the three-piece vehicle transport cover described above could be fully attached to a vehicle by two persons in less than 3.5 minutes. The single piece cover described above can be fully attached to a vehicle by two persons in five to eight minutes, depending on the number of openings cut into the cover. The transport covers of the invention protect those portions of a vehicle most susceptible to transport damage, including the front and rear bumpers. The vehicle transport covers of the invention also protect vehicles against exterior fluids such as acid rain, while permitting the escape of water vapor or off-gassing solvents. The vehicle transport covers of the invention are formed and attached with releasable reinforcement straps such that wind is prevented from getting under the car cover in areas near the wheel wells and bumpers. The covers of the invention remain securely attached to a vehicle at relative air movement speeds of 50 mph along the major axis of the covered vehicle. The transport covers permit inspection of body panels of a covered vehicle during transport, they do not significantly inhibit a driver's access to the covered vehicle, and they do not obstruct the view of a driver of the covered vehicle to the extent that the vehicle cannot be safely driven. In addition, the vehicle transport covers of the invention avoid any adhesive contact with the vehicle finish and they leave substantially no visible residue on the painted surfaces of a vehicle to which the covers have been applied. Finally, substantial portions of vehicle transport covers of the invention are both reusable and recyclable. It will be apparent to those skilled in the art that modifications and variations can be made in the motor vehicle transport covers of this invention. The invention in its broader aspects is, therefore, not limited to the specific details, and the representative apparatus described above. Thus, it is intended that all matter contained in the foregoing description and drawings shall be interpreted as illustrative and not in a limiting sense.

We claim:

1. A motor vehicle transport cover comprising:

a nonwoven sheet having a water vapor transmission rate of at least 100 g/m$^2$ in 24 hours according to ASTM standard E96, method B, having a liquid water permeability resistance expressed by a hydrostatic head pressure of at least 1 m according to AATCC standard 127, and having an Elmendorf tear strength of at least 12N, said sheet having a front section for covering a front bumper, a hood, and front side panels of a vehicle, a middle section for covering a roof and door panels of the vehicle, and a rear section for covering rear panels and a rear bumper of the vehicle;

attachment means for firmly attaching said nonwoven sheet to the vehicle to which the transport cover is attached and for maintaining said covering at relative air movement speeds of at least 50 mph along a lengthwise direction of the vehicle, said attachment means being manipulable to readily release said nonwoven sheet from the vehicle and readily reattach said nonwoven sheet to said vehicle in a manner that permits inspection under the hood of the vehicle to which the cover is attached and permits inspection of the front side panels, the door panels, and the rear panels of the vehicle to which the cover is attached, said attachment means including at least one pair of locking straps, each locking strap of said pair being attached at a first end to said transport cover, each locking strap of said pair having a second end opposite the first end and having at the second end a locking member fastenable to a locking member at the second end of the other locking strap of said pair of locking straps, the transport cover being securable around an underside of the vehicle by fastening said locking members of said at least one pair of locking straps, said attachment means leaving no visible residue on the hood, the front side panels, the roof, the door panels, or the rear panels of the vehicle to which the cover has been attached when the nonwoven sheet is removed from the vehicle; and access means for permitting a driver to readily access the vehicle to which the vehicle transport cover is attached without removing the transport cover from the vehicle.

2. The motor vehicle transport cover of claim 1 wherein said at least one pair of locking straps includes at least one pair of front locking straps, each locking strap of said pair of front locking straps being attached at a first end proximate a front edge of the front section of said transport cover, each locking strap of said pair of front locking straps having a second end opposite the first end thereof and having at said second end thereof a locking clip fastenable to a locking clip at the second end of the other locking strap of said pair of front locking straps, the front edge of the transport cover being securable around the vehicle's front bumper by fastening said locking clips of said at least one pair of front locking straps;

said front section of said transport cover has a rear edge that corresponds to a rear edge of the hood of the vehicle to which the cover is attached, said rear edge of said transport cover front section having two opposite ends; and said attachment means further comprises at least one strap that extends from each of the two opposite ends of said rear edge of the front section of the transport cover for attaching to sides of the vehicle to which the cover is attached.

3. The motor vehicle transport cover of claim 2 wherein said front edge of said front cover section is securable to the front bumper of the vehicle to which the transport cover is attached by multiple pairs of locking straps, each of the multiple pairs of locking straps comprising first and second straps attached at first ends thereof at points proximate the front edge of the front section of the cover at a spacing of more than 6 inches from each other and having at second ends thereof means for releasably clipping the second ends of said first and second straps of each said multiple pair to each other.

4. The motor vehicle transport cover of claim 3 wherein said straps that extend from each of the two opposite ends of said rear edge of the front section of the transport cover are each configured to attach to a side view mirror support arm on the vehicle to which the cover is attached.

5. The motor vehicle transport cover of claim 2 wherein said attachment means further comprises at least one pair of rear locking straps, each locking strap of said pair of rear locking straps being attached at a first end proximate an edge of the rear section of said transport cover, each locking strap of said pair of rear locking straps having a second end opposite the first end thereof and having at said second end thereof a locking clip fastenable to a locking clip at the second end of the other locking strap of said pair of rear locking straps, the edge of the rear section of the transport cover being securable around the vehicle's rear bumper by fastening said locking clips of said at least one pair of rear locking straps.

6. The motor vehicle transport cover of claim 2 wherein
said middle section is between said front and rear sections, and said middle section has a top for covering the roof of the vehicle and a pair of sides for covering the door panels on the sides of the vehicle to which the transport cover is attached, said middle section sides of the transport cover each having edges that generally correspond to a bottom edge of the door panels of the vehicle to which the cover is applied, and wherein said cover middle section further includes means for releasably attaching the cover middle section's side edges to a bottom of the vehicle to which the cover is attached; and said access means comprises a flap cut into a portion of the transport cover that corresponds to a driver's door of the vehicle to which the cover is attached, said flap having a front edge that corresponds to a hingeline of the driver's door of the vehicle to which the transport cover is attached, top and bottom edges that generally correspond to a top edge and a bottom edge of the driver's door to which the transport cover is attached, and a back edge that corresponds to a rearward edge of the driver's door that is opposite the door's hingeline, and wherein said flap is permanently attached to the transport cover along the front edge of said flap, said flap is releasably attached to the transport cover along the top edge and the back edge of the flap, and said flap includes means for releasably attaching the bottom edge of said flap to the bottom edge of the driver's door of the vehicle to which the transport cover is attached.

7. The motor vehicle transport cover of claim 6 wherein said flap edges that correspond to the top edge and the back edge of the driver's door of the vehicle to which the transport cover is applied are releasably attached to the transport cover by means of complementary pairs of hook and loop fastening strips wherein a first of the hook and loop fastening strips of the pair thereof is bonded to the top edge and the rear edge of the flap and a second of the hook and loop fastening strips of the pair thereof is bonded to a portion of the transport cover abutting said first of the hook and loop fastening strips of the pair thereof.

8. The motor vehicle transport cover of claim 7 wherein said means for releasably attaching the cover middle section's side edges to the bottom of the vehicle to which the cover is attached comprises complementary pairs of hook and loop fastening strips wherein a first of the hook and loop fastening strips of the pair thereof is bonded to a section of each of the cover's middle section side edges and a second hook and loop fastening strip of the pair thereof is adhesively bondable to the bottom of the vehicle to which the cover is attached.

9. The motor vehicle transport cover of claim 6 wherein the rear edge of said front section defines a bottom edge of an elongated opening in said cover that substantially corresponds to a windshield of the vehicle to which the cover is attached, and wherein said elongated opening in said cover is further defined by a top opening edge and two side opening edges in the vehicle transport cover, said top opening edge being configured to correspond to a top edge of the windshield of the vehicle to which the vehicle transport cover is attached and being on a side of said elongated opening opposite the rear edge of said front section, said two side opening edges being configured to correspond to opposite sides of the windshield of the vehicle to which the transport cover is attached, said top and side opening edges of said elongated opening being trimmed with adhesive tape for attaching to the windshield of the vehicle to which the transport cover is attached.

10. The motor vehicle transport cover of claim 9 wherein the adhesive tape is a single-sided adhesive tape with first and second bands of adhesive applied thereto, the first of said adhesive bands being a high strength adhesive that attaches to the nonwoven sheet with an adhesive strength at least 10N/25 mm, and the second of said adhesive bands being a lower strength adhesive that attaches to the windshield of the vehicle to which the nonwoven sheet is attached with an adhesive strength in a range of 6 to 10N/25 mm.

11. The motor vehicle transport cover of claim 9 further comprising a second opening in a portion of the transport cover corresponding to a rear window of the vehicle to which the cover is applied, and a third opening in a portion of the transport cover corresponding to a passenger side window of the vehicle to which the cover is applied, said second opening being trimmed with adhesive tape for attaching to the rear window of the vehicle to which the transport cover is attached, and said third opening being trimmed with adhesive tape for attaching to the passenger side window of the vehicle to which the transport cover is attached.

12. The motor vehicle transport cover of claim 9 wherein said nonwoven sheet has a delamination strength of at least 0.3N/25 mm.

13. The motor vehicle transport cover of claim 9 wherein said rear edge of said front section of said transport cover is configured such that it does not interfere with movement of windshield wipers of the vehicle to which the vehicle transport cover is attached.

14. The motor vehicle transport cover of claim 9 wherein said sheet further has translucent panels oriented so as to cover headlights of the vehicle to which the transport cover is attached.

15. The motor vehicle transport cover of claim 2 wherein said front section of said vehicle transport cover further has an opening in the sheet proximate the rear edge of said front section, which opening is substantially round and has a diameter of less than 1 inch, and which opening corresponds to a windshield wiper fluid nozzle of the vehicle to which the transport cover is attached.

* * * * *